Jan. 31, 1933.　　　　J. ZUCCA　　　　1,895,832
RUMBLE SEAT AND MECHANISM FOR OPERATING THE SAME
Filed Feb. 19, 1932　　　2 Sheets-Sheet 1
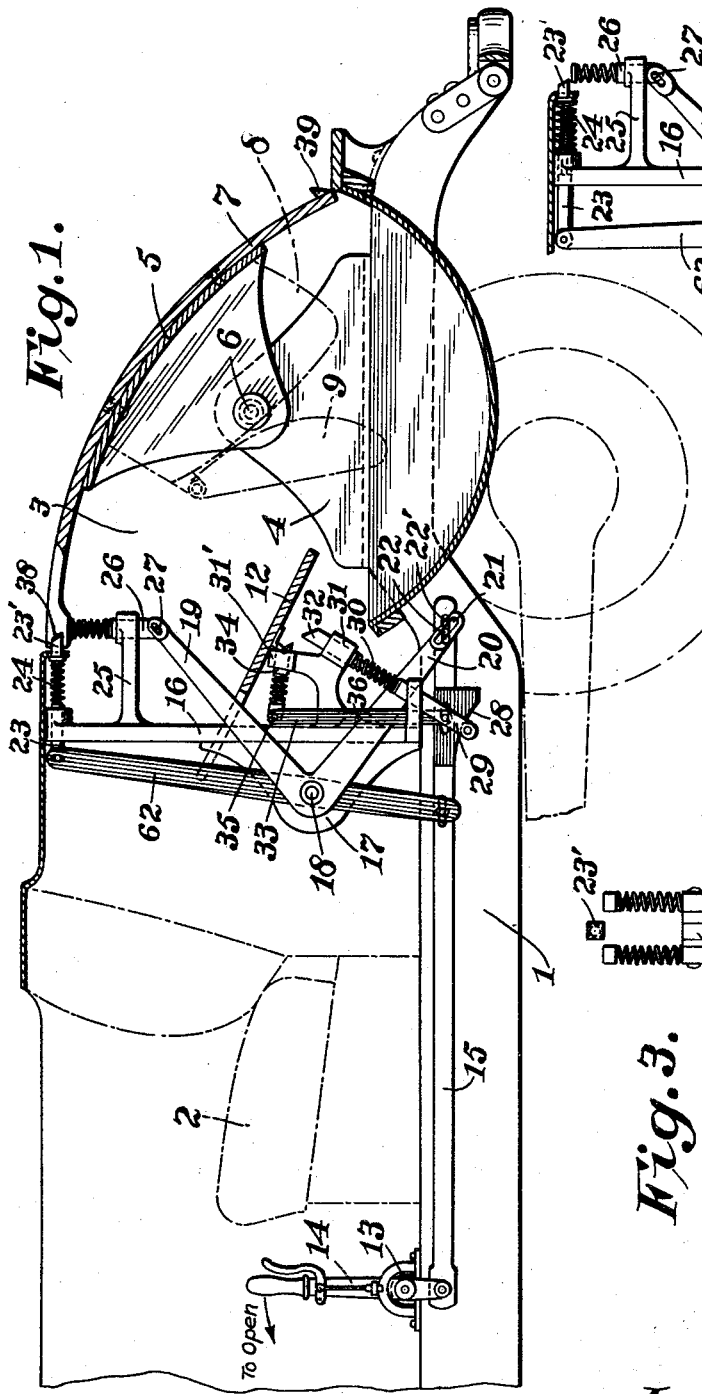
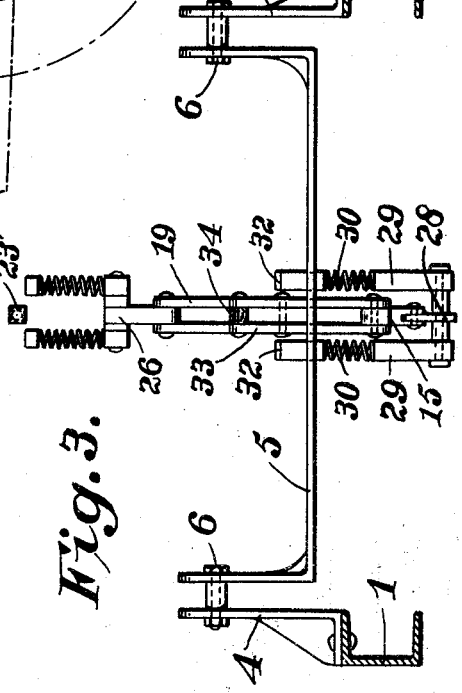
Inventor:
Joseph Zucca,
By George E. Cook.
Attorney.

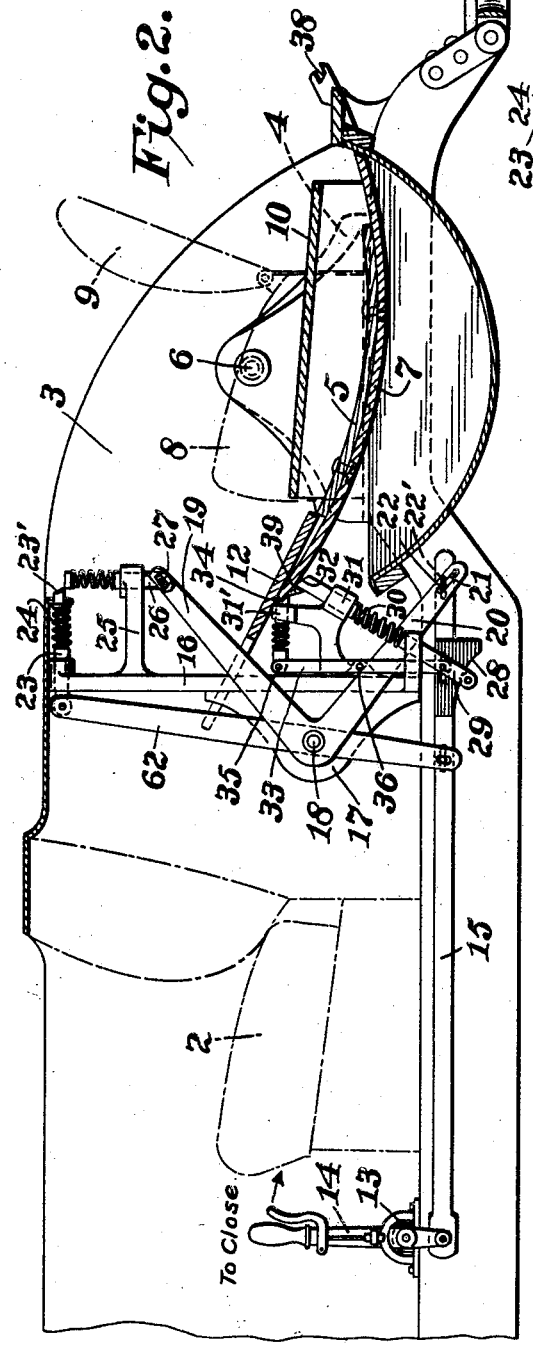
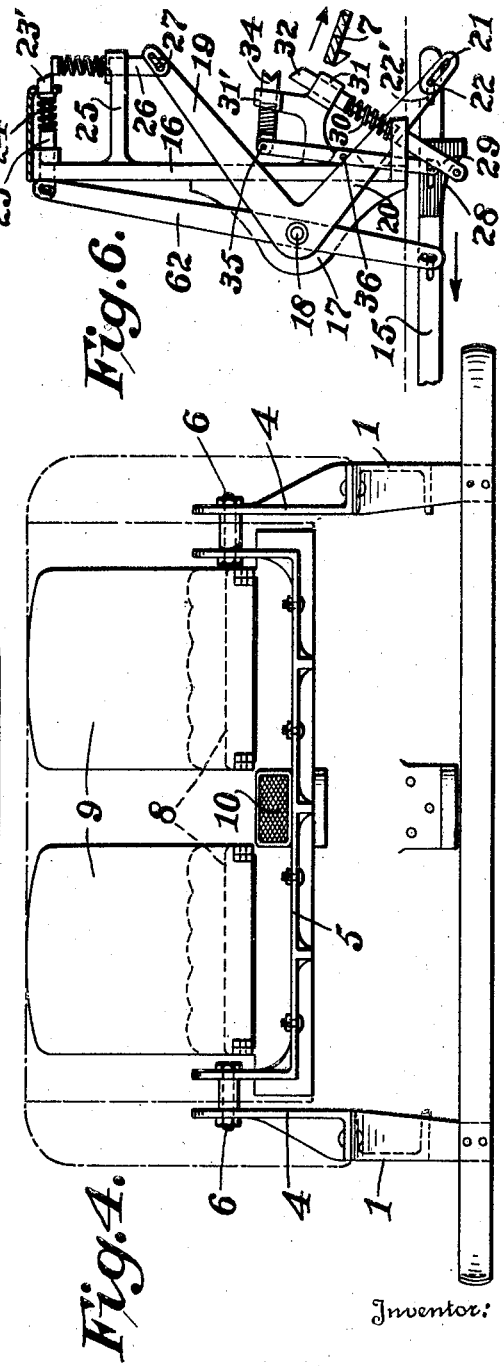

Patented Jan. 31, 1933

1,895,832

UNITED STATES PATENT OFFICE

JOSEPH ZUCCA, OF KINGSTON, NEW YORK

RUMBLE SEAT AND MECHANISM FOR OPERATING THE SAME

Application filed February 19, 1932. Serial No. 594,083.

My invention relates to new and useful improvements in rumble seats and the manner of operating the same, and has for an object to provide a rumble seat that may be quickly and efficiently operated from the driver's seat.

Still another object of the invention is to provide a rumble seat that is mounted for oscillation, that is, an opening and closing movement, which may be controlled from the driver's seat by the shifting of a lever, thus doing away with the ordinary inconveniences of trying to lean over the rear wheels and open or close the seat.

Still another object of the invention is to provide a rumble seat which, in turn, is provided, so that a person stepping into the rumble seat may step on a foot board rather than step on the upholstery, which is now the usual procedure.

Still another object of the invention is to provide a rumble seat which may be efficiently operated from the driver's seat, the rumble seat being tightly held in its open position after the lever is thrown in one direction and tightly locked in its closed position after the lever is thrown in the other direction.

Still another object of the invention is to provide the opening and closing mechanism so that when certain crank arms and levers are operated and tension is put on the several members, the latches are released. Thus, there will be a strong impetus given to either the opening or closing movement of the rumble seat, which is pivotally mounted in the form of a cradle.

With these and other objects in view, the invention consists in certain new and novel arrangements and combination of parts, as will be hereinafter more fully described and pointed out in the claims.

Referring now more particularly to the drawings showing a preferred embodiment,

Fig. 1 is a central vertical section of an automobile with the rumble seat being shown in closed position;

Fig. 2 is a similar view but showing the deck thrown down and the rumble seat in its open position;

Fig. 3 is a substantially vertical sectional view showing the manner of hanging or supporting the rumble seat;

Fig. 4 is a rear view showing the rumble seat being open;

Fig. 5 is a fragmentary detail showing the parts of the opening and closing mechanism operated to open the seat;

Fig. 6 is a similar view with parts having been operated to close the same.

Referring to the drawings, and for the moment to Fig. 1, there is shown a part of the chassis 1 of an automobile, with the driver's seat 2 therein and the rear compartment 3 for the rumble seat. Now in this rear compartment, there are the side brackets 4 to which is pivoted the cradle 5 of the rumble seat, as at the two points 6. The brackets 4, as may be seen, are riveted to the side frames 1 of the chassis.

It will be noticed that there is a deck 7 which is a part of the rumble seat 5, and it is this deck that closes the compartment 3 when the rumble seat is closed (inverted). This deck extends practically from the chassis frame to the upper edges of the sides of the automobile to close the compartment 3 in the usual manner.

It will also be obvious that the rumble seat proper comprises two individual seats 8 with their backs 9 rather than just the one seat, as is usually the case, and between these seats there is a floor board or step 10. Likewise, below this, there is another step on the chassis, so that one may step from the ground to the first step and then up into the rumble seat without putting his foot on the upholstery of the seats.

The two seat backs 9 are designed to fold inwardly, so that when the rumble seat proper is closed, the backs in their folded position will not strike the floor of the compartment 3.

It will be noticed that by pivoting the rumble seat proper at the points 6, it may swing from the position shown in Fig. 1 about the points 6 as an axis to the position shown in Fig. 2, that is, the deck in this instance will extend from a point just rear of the step 10 down along the floor of the compartment 3 and upwardly under a foot board 12, so that when there is an occupant, or occupants, in the rumble seat, his feet will not become entangled in the mechanism now to be described.

Having set out the structure and the manner in which the rumble seat is pivotally mounted, the mechanism for operating the rumble seat will now be set forth.

Referring for the moment to Fig. 1, there will be seen a bracket 13 in which is pivotally mounted the operating lever 14 which, in turn, is pivotally connected at its lower end to the main operating rod 15, which extends rearwardly under the compartment 3.

Referring again for the moment to Fig. 1, there will be seen mounted on the upright 16 the forwardly extending and centrally positioned bracket 17 in which is pivotally mounted, as at 18, the bell crank 19. The lower end 20 of this bell crank is provided with a slot 21 through which, in turn, fits a bolt 22 and also extends through a slot 22' in the arm 15. Also slottedly connected to this arm 15 is the arm 62 pivoted in the bracket 17 and extends from the arm 15 up to a latch bar 23, which is spring-pressed, as at 24. Extending from the upright 16 may also be seen the bracket 25 through which a spring plunger 26 extends, which has a slot and pin connection, as at 27, with the upper end of the bell crank 19.

Now on the lower surface of the rod 15, there will be noticed a cam 28 over which fits a bifurcated arm 29 provided with a spring 30, the upper end of this rod passing through the bracket 31 and the arm 29 being, in reality, a latch with the latch nose 32.

Also slottedly connected with the arm 15 adjacent the arm 29 is the vertical arm 33, which is provided with a spring-pressed plunger 34 pivotally mounted, as at 35, the outer end passing through the support 31'. It will be noticed that this upright arm 33 is also pivotally mounted to the upright 16, as at 36.

Before explaining the operation of the opening and closing mechanism, it might be mentioned that the upper edge of the deck 7 is provided with the latch receiving cut-out 38, while at the lower edge of the deck is the little tongue 39, which will engage the latch nose 32 when the deck is swung inwardly, as will be shortly explained.

*Operation for the rumble seat*

Supposing now that the rumble seat is closed, as shown in Fig. 1 of the drawings. The handle or lever 14 will be moved forwardly which, in turn, forces the rod 15 rearwardly. This, in turn, will move the lower end of the arm 62 rearwardly to thus withdraw the latch 23 from its pocket 38 in the upper edge of the deck 7. While the latch, however, is being withdrawn, the bell crank 19, through its connection with the arm 15 will be operated to move the upper leg of the bell crank lever upwardly to thus exert a spring pressure upwardly on the rumble seat deck. As the arm 15 continues to move rearwardly to its furthermost end of travel, the tension on the spring plunger 26 increases, so that by the time the latch nose 23' is pulled out of engagement, sufficient built-up pressure will be exerted on the deck of the rumble seat to cause it to swing on its pivotal points 6, and the momentum of the rumble seat will cause it to swing from its closed position to its open position and the forward end of the deck will now be just below the floor board 12 within the compartment 3, as may be seen in Fig. 2.

When the deck has swung to the position shown in Fig. 2, the little latch face 39 will pass over the latch nose 32, and the lower edge of the deck will abut the little spring-pressed member 34 which, it will be remembered, is pivoted to the upper end of the lever 33 and supported at its free end by the support 31'.

This opening and closing mechanism will now appear, as shown in Fig. 5, the rumble seat and deck being omitted from the drawings for the sake of clearness of illustration. After the seat has been operated, the handle 14 will be returned to its neutral position by the operator.

When it is desired to close the rumble seat, that is, move it from the position shown in Fig. 2 to the position shown in Fig. 1, the operation is just the reverse. That is, the handle 14 is now pulled rearwardly which, in turn, will pull the rod 15 forwardly, and as this arm 15 is pulled forwardly, it will be seen that the arm 33 is pulled forwardly, i. e. at its lower end to exert a pressure through the spring plunger 34 to the edge of the deck and, at the same time, the cam 28 riding on the roller of the arm 29 will pull down the arm 29 with the latch nose 32, so that the latch nose 32 will be withdrawn from behind the little lug 39. As the latch nose 32 is withdrawn, the pressure of the spring plunger 34 will exert a rearward pressure on the forward edge of the deck of the rumble seat to again throw it around on its pivotal points 6 to the position shown in Fig. 1. At the same time, the arm 62 will have moved to its normal position, so that the latch on its upper end will, in turn, again engage the pocket 38 in the upper edge of the deck and the bell crank 16 will assume its normal position ready to exert an upward pressure on the deck when the handle 14 is again operated.

From this, it will be seen that it is an easy matter to open or close the rumble seat by simply a forward or rearward movement of the handle 14 and that there is no possibility of the rumble seat rattling when in its closed position, and likewise it is securely latched in place when in its open position.

Should the seat be open and the operator push the handle 14 forwardly, the seat will not be operated, as the various lost motions will simply allow the bolts or pins to idle in their slots. This is, of course, also true if the handle 14 were pulled rearwardly when the seat was already in its closed position.

Having thus described my invention, what I claim as new and desire to secure by Letters Patent is:—

1. A rumble seat adapted to be pivotally mounted in the rear of an automobile, said seat including a deck, a latch for cooperating with the upper forward edge of the deck and a latch cooperating with the lower forward edge of the deck, manually-operated means for exerting an upward pressure on said deck, further means for exerting a pressure on the lower forward edge of said deck, and means for respectively releasing the latches while pressure is being exerted on the said deck for the opening and closing movements.

2. A pivotally mounted rumble seat including a deck, a latch cooperating with the forward edge of the deck to hold the deck in its closed position and a further latch cooperating with the lower forward edge of the deck for holding the deck in its open position, a manually-operated rod cooperating with said latches for respectively releasing said latches depending on which way said rod is operated, and further means connected with the rod for exerting a pressure on the deck to swing the deck from its one position to the other and for releasing the latch which is at the time holding the deck in one of its locked positions.

3. A rumble seat, an arm connected with said rumble seat and a lever connected with said arm, a bell crank lever connected to said arm for exerting a pressure to respectively open and close said rumble seat when said lever is operated, latches also connected with said arm for operating said rumble seat, and the said latches being released by the movement of said arm after pressure is built up to oscillate said rumble seat from its open and closed positions.

4. A rumble seat mounted for pivotal movement, latches for holding the seat in its respective position, manually-operated mechanism for exerting a pressure on the seat to revolve said seat when said manually-operated means is actuated, releasing mechanism for the latches connected with the manually-operated mechanism and adapted to release the desired latch after pressure has been built up on the mechanism for revolving the seat.

In testimony whereof, I affix my signature.

JOSEPH ZUCCA.